Figure 1:
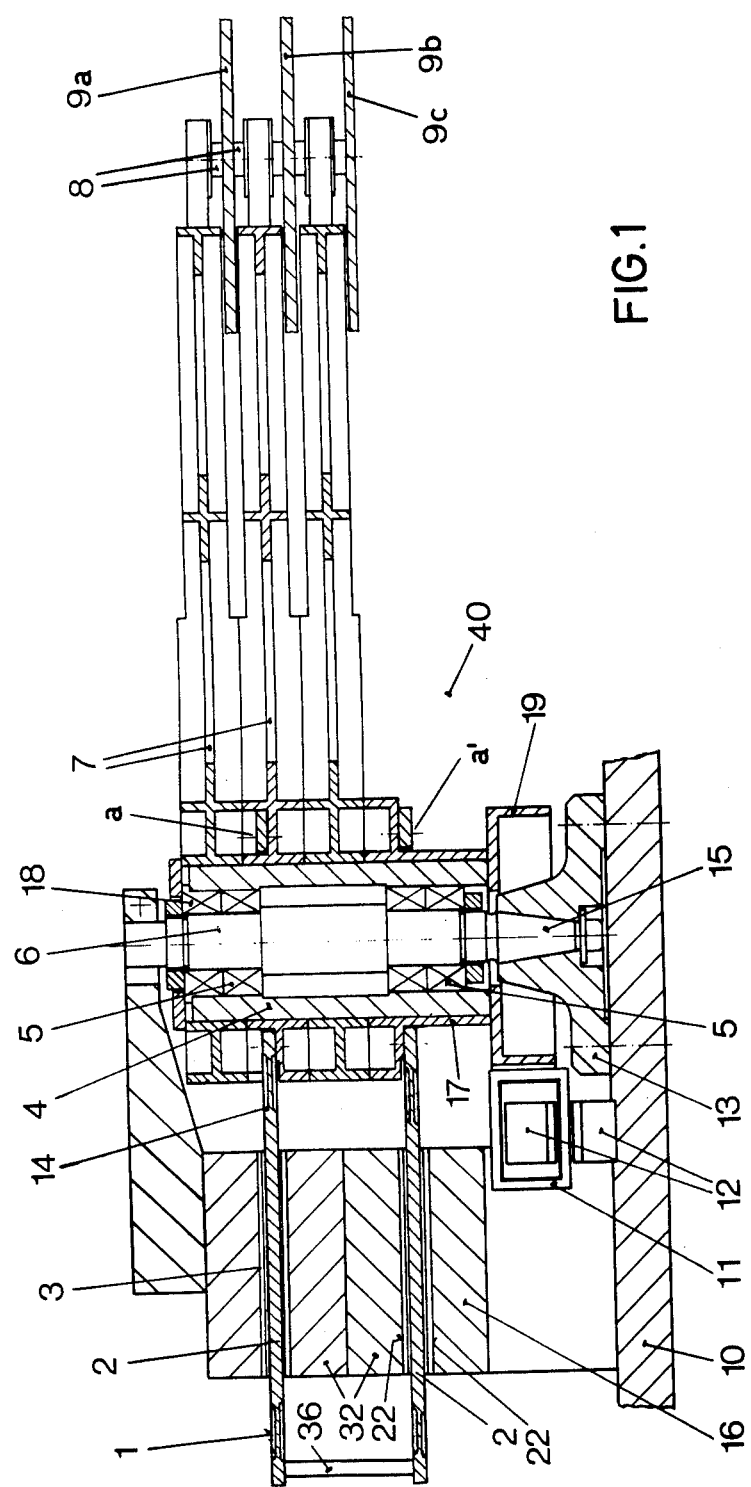

United States Patent [19]

Manzke et al.

[11] 4,196,456

[45] Apr. 1, 1980

[54] MAGNETIC HEAD PIVOTAL SUPPORT WITH COMPACT DRIVE MEANS

[75] Inventors: Klaus Manzke, Westheim; Peter Hammerschmitt, Bruehl-Rohrhof; Karl Uhl, Frankenthal, all of Fed. Rep. of Germany

[73] Assignee: BASF Aktiengesellschaft, Ludwigshafen, Fed. Rep. of Germany

[21] Appl. No.: 906,444

[22] Filed: May 17, 1978

[30] Foreign Application Priority Data

May 23, 1977 [DE] Fed. Rep. of Germany ....... 2723140

[51] Int. Cl.$^2$ ............................................. G11B 21/02
[52] U.S. Cl. ................................................... 360/106
[58] Field of Search .................................. 360/77–78, 360/104–106, 97–99, 86

[56] References Cited

U.S. PATENT DOCUMENTS

| | | | |
|---|---|---|---|
| 3,849,800 | 11/1974 | Cuzner et al. | 360/97 |
| 4,150,407 | 4/1979 | Dijkstra | 360/106 |

FOREIGN PATENT DOCUMENTS 2623572 12/1976 Fed. Rep. of Germany .
1440455 6/1976 United Kingdom .................... 360/106

OTHER PUBLICATIONS

I.B.M./T.D.B. vol. 17, No. 10, Mar. 1975, pp. 3016–3017, "Disk File Actuator" by Lissner et al.
I.B.M./T.D.B. vol. 16, No. 10, Mar. 1974, p. 3385, "Recording and/or Reproducing Head Assembly" by Cuzner et al.
I.B.M./T.D.B. vol. 19, No. 4, Sep. 1976, p. 1440, "Actuator Retaction Device" by Hearn.
IBM Journal of Research & Development vol. 20, No. 4, pp. 389–397, Jul. 1976, Design for Swinging Arm Actuator*** by Health.

*Primary Examiner*—John H. Wolff
*Attorney, Agent, or Firm*—Keil & Witherspoon

[57] ABSTRACT

A positioning device for objects of low mass, particularly magnetic heads in memory processing units having at least one pivotable head support and at least one pivotable support for at least one coil, which coil support is located in the air gap of a magnet assembly, the magnet assembly comprising pairs of flat permanent magnets whose air gaps are arranged next to each other and whose poles are so arranged that poles of unlike polarity are opposite each other, and the coil(s) being of elongate shape, the longitudinal conductors of which coil(s) are always located inside the said air gaps and the transverse conductors are always located outside said air gaps.

The device of the invention can be used for all positioning operations requiring a very high degree of accuracy, in particular to position write/read devices of every kind and measuring and testing probes in control engineering and the laboratory.

17 Claims, 4 Drawing Figures

MAGNETIC HEAD PIVOTAL SUPPORT WITH COMPACT DRIVE MEANS

The present invention relates to a device for positioning objects of low mass, particularly magnetic heads over preselected tracks on at least one magnetic disc which can be coupled to a drive in a memory processing unit in which there are provided at least one support for at least one magnetic head, which support is pivotable about an axis parallel to the axis of rotation of the magnetic disc, and at least one coil support for a drive means for pivoting the head support, and in which the said drive means consists of at least one flat coil which projects into at least one working air gap of a magnet assembly.

A device of the above type is described for example in German Laid-Open Application DOS 26 23 572, in which a magnetic coil in the form of spiral conductors arranged on a flat support acts as drive means, and projects into the air gaps between the legs of two horseshoe magnets. In the case of this positioning device the coil is oval in shape, the effective portions of the windings being arranged parallel to imaginary straight lines passing through the axis of the head arm.

This prior art device is disadvantageous because
(a) only a small portion of the windings plays a part in effecting pivoting of the head support,
(b) the head support and the support for the drive means are arranged in parallel planes which are far apart from one another,
(c) it constitutes a single-head positioning device for a single-disc memory,
(d) it has two magnet systems that have to be mounted separately, which makes it necessary for them to be aligned relative to one another on two supports that are at a large distance from one another, and
(e) the magnet systems are not suitable for an extremely flat construction.

Another positioning device is disclosed for example in German Published Application DAS 22 09 522, in which there is provided a common support for at least one magnetic head, the support being pivotable about an axis parallel to the axis of rotation of the magnetic disc, and for a drive for pivoting the support, the magnetic head being arranged at the fork-shaped end of the support and the said drive at the other free end of the support.

However, this device has the disadvantage that the magnetic coil is a hollow rectangular coil of elongate shape which projects into the air gaps of an E-shaped stator, a magnet assembly of the short air gap type thus being formed.

The prior art devices have the disadvantage that they are too large, particularly in the vertical direction, which makes their production as well as the assembly of the individual parts very expensive.

It is therefore an object of the present invention to provide a positioning device which, as compared with the prior art devices, is cheaper to produce in large numbers, permits extremely short head positioning times and hence extremely short access times, exhibits a better vibrational behavior, and enables the number of heads and hence the number of discs and consequently the capacity of memory processing units to be readily increased.

This object is achieved with a device for positioning objects of low mass, particularly magnetic heads, wherein the magnet assembly consists of at least two pairs of flat permanent magnets, the two working air gaps of which are arranged next to each other in the same plane, and the poles of which are so arranged that poles of unlike polarity are opposite each other, wherein each pair of adjacent poles of opposite polarity is magnetically connected together via a common flux-conducting member, and wherein the flat coil is of elongate shape, the longitudinal conductors of said coil being always located inside the working air gaps of the pairs of permanent magnets, and the transverse conductors being always located outside said air gaps.

As a result of the flat shape of the coil, it is possible to optimally design the entire pivoting arm assembly and hence to keep the overall height of the positioning device low, while increasing the pivoting torque and consequently shortening the access times. With this compact and yet powerful construction it is also possible to combine one or more of such positioning devices and a corresponding number of magnetic discs in a housing to form a fixed head storage module. In addition, such a positioning device is suitable for positioning any kind of object of low mass, e.g. optical devices such as lenses and optical scanners.

The term "positioning", as used herein, means not only the moving and aligning of a first member relative to a second member, but also the controlled movement of the two members relative fo one another, e.g. the oscillation thereof at any desired frequency.

In a further advantageous embodiment of the invention the coil supports and head supports are so designed that they can be stacked above one another and arranged in a predetermined position relative to their axis of rotation.

The positioning device can thus be modified with respect to the number of objects (e.g. magnetic heads) to be positioned and the number of members (e.g. magnetic discs) associated therewith and hence suitably adapted for a particular task.

In another advantageous embodiment of the invention, sets of two pairs of permanent magnets are provided with flux-conducting members, the pairs of magnets and the flux-conducting members being arranged above one another.

Arrangement of the magnets in this way enables a construction of very low overall height to be achieved.

In yet another advantageous embodiment, each head support is provided with at least one coil support which is preferably detachably connected thereto.

With this design of the positioning device it is possible to adjust the pivoting torque acting on the head support(s) as required by altering the number of coils.

In an even further advantageous embodiment of the invention, there is provided on the axis an adjustable rotatable hub for carrying the coil and head supports, and the said supports are provided with apertures so that they can be mounted on the hub.

In a preferred embodiment of the invention, the flat coil consists of a plurality of substantially rectangular conductors, the direction of current flow in the longitudinal conductor portions being so chosen that the resulting force vectors in the magnetic fields in the two working air gaps are in the same direction.

Further advantages are achieved in the production of the device of the invention and in the further reduction of its overall height if the flat coil is applied to the support in the form of a printed circuit; preferably, such a coil is applied to each side of the support. This design enables the advantages of low overall height and at the same time adequate pivoting torque to be achieved particularly easily.

If a coil is on each side of the support instead of being on one side only, each coil having the same number of conductors, twice the induced force can be obtained when the conductor cross section is the same and the air gap is the same.

It is advantageous to rigidly connect the head supports to a tachometer consisting of a coil and a fixed magnet.

In another advantageous embodiment of the device of the invention, the pairs of permanent magnets consist of small flat pieces of magnetic material having a high energy product and a low demagnetization factor. To achieve a particularly flat construction, the pieces of magnetic material are made much thinner than the flux-conducting members.

In summary, the invention provides an inexpensive device which is distinguished particularly by its compact design and which can be modified as desired, i.e. increased or reduced in size, due to the fact that the coil and head supports can be stacked on top of one another.

In yet another advantageous embodiment, a magnet having two air gaps is employed in which two coils designed according to the present invention are arranged. As a result, a very sturdy device from the dynamics and strength points of view is obtained which offers particular advantages with respect to its vibrational behavior.

Figure 2:
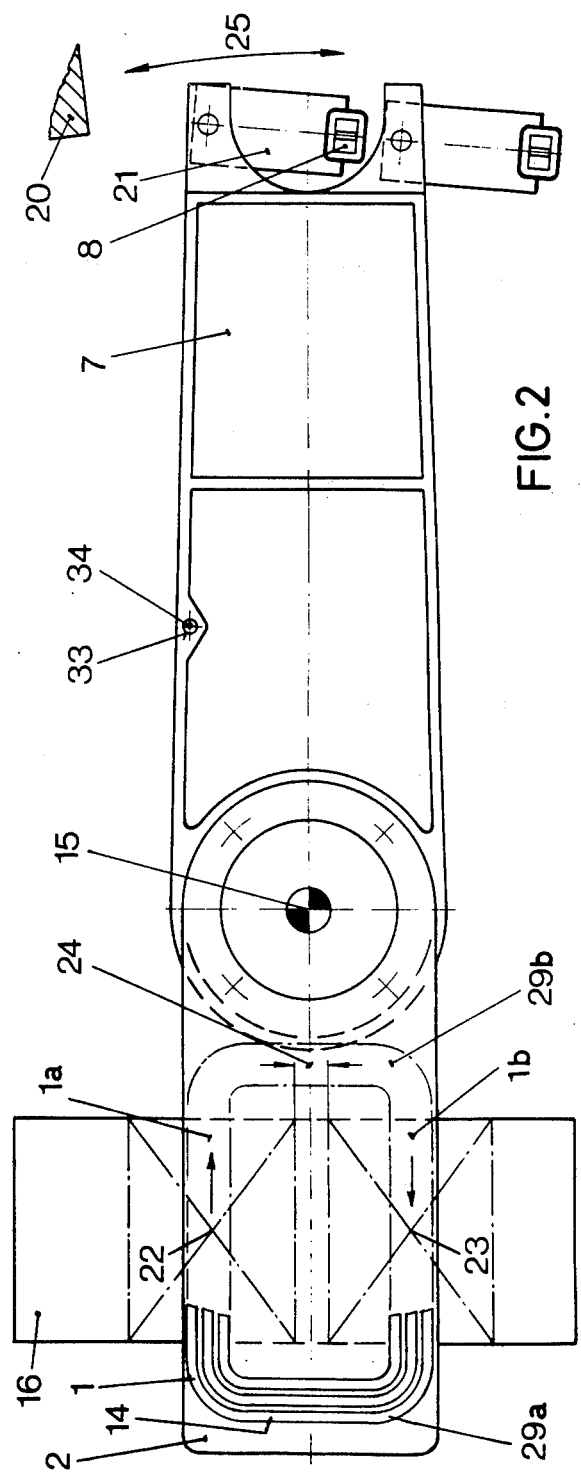
Figure 3:
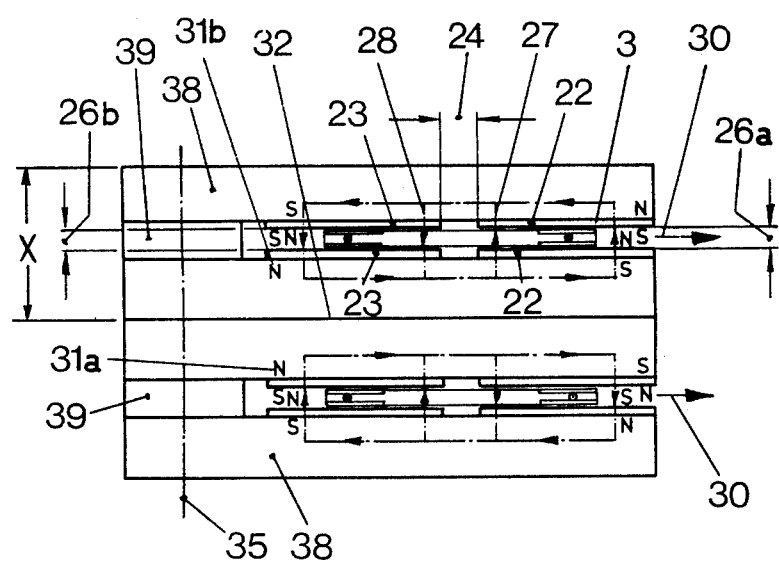
Figure 4:
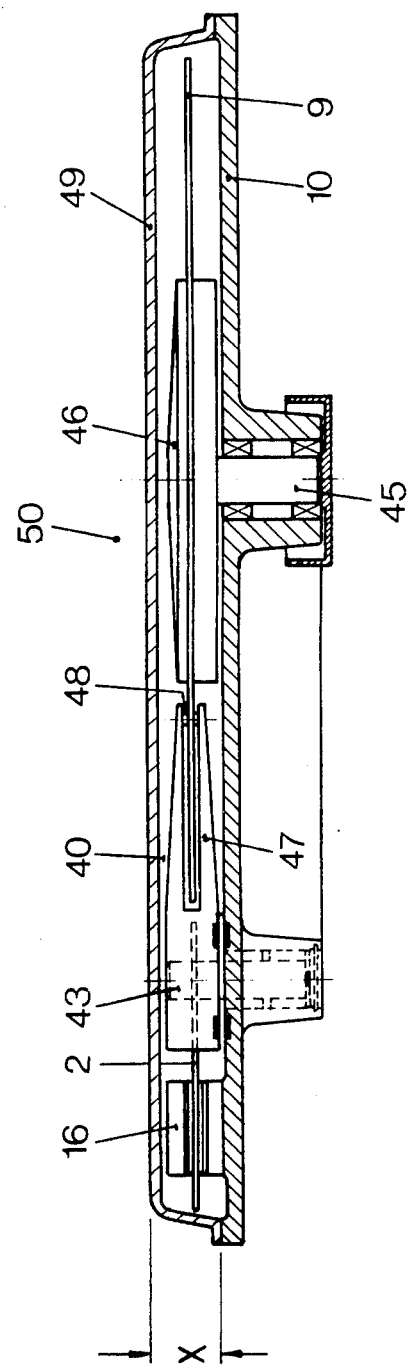

Further details of the invention are disclosed in the following description of the embodiments of the positioning device illustrated in the accompanying drawings, in which FIG. 1 is a schematic vertical section through the positioning device of the invention, also showing part of the chassis of a memory processing unit and portions of magnetic discs, FIG. 2 is a schematic plan view of the positioning device of FIG. 1, also showing the magnetic head arrangement, FIG. 3 is a schematic end view of two superposed permanent magnet systems, showing the coil supports and coils in the air gaps and the magnetic flux paths, and FIG. 4 is a schematic cross-sectional view of a single-disc memory processing unit of extremely low overall height.

The positioning device 40 consists essentially of an arm having two sections of different length. The long section is formed by the head support 7 and the magnetic heads 8 fastened thereto, and the short section by a flat coil support 2 and coil(s) 14 which may be of conventional design or, advantageously, in the form of substantially rectangular conductors produced for example by printed circuit techniques.

The above-described flat coil forms, together with the magnetic device 16, advantageously a permanent magnet assembly, the heart of the drive. The arm is mounted for pivotal movement in the directions indicated by double arrow 25 about a fixed axis 15 which is fastened to chassis 10 by means of flange 13, it being possible for pivoting to be effected simultaneously in more than one horizontal plane, as shown in FIG. 1. Two pairs of anti-friction bearings 5, e.g. ball bearings, which are fastened with a tight fit on shaft 6, serve as bearings. The housing for the bearings 5 is formed by hub 4 which carries the superposed coil supports 2 and head supports 7. The coil supports 2 and head supports 7 provided with circular apertures (cf. FIG. 2) are supported by flange 13 via sleeve 17. The number of coil supports 2 and head supports 7 can therefore be increased for example by 2 or 3. It is also possible to employ a split hub provided with flanges which is rotatable about axis 15, the arms for the objects to be positioned being fastened to one side of the hub and the coil supports to the other. The axial position of the head supports 7 and hub 4 is adjusted and fixed at the top via a flanged bearing 18 whose collar is firmly pressed against the end of hub 4. As a result, the position of the magnetic heads 8 relative to the surfaces of the discs 9a, 9b and 9c is predetermined. The coil support 2 which in the case of printed circuits may consist of an appropriate plastics insulating material is detachably fastened, e.g. by means of screws (not shown), to the head supports 7 at points a and a'. The magnetic device 16 is fastened to the chassis 10 by means of, for example, screws represented by the dot-dash line 35 in FIG. 3. Other screws (not shown) serve to join the parts of the magnetic device 16 together. To achieve rapid and accurate positioning with the device of the invention, it is necessary to ascertain the speed at which the heads 8 pivot. For this purpose there is provided a tachometer which may for example consist of a permanent magnet system 12, fastened to chassis 10, and a rectangular coil 11 which has a large number of windings and whose support member 19 is attached to the lower end of hub 4. The voltage generated in the rectangular coil 11 by movement thereof is a measure of the momentary velocity of the head support 7 and heads 8. Pivotal movement of the head support 7 is advantageously limited by an adjustable stop 20 (FIG. 2).

Further details of the positioning device will be apparent from the following explanations concerning its function:

The magnetic heads 8 which are attached to the head supports 7 via spring members 21 should be able to be moved very quickly and precisely across the surfaces of magnetic discs 9a, 9b and 9c and positioned over preselected tracks by pivotal movements in horizontal planes. To this end, current is passed through the coils 14 of conventional design or formed by conductors 1, as a result of which a torque is applied to the coil supports, thus causing the head supports 7 to rotate about axis 15, so that the magnetic heads 8 move along an arcuate path. The direction in which the head supports 7 pivot is determined by the direction of current flow in the coils 14. Slowing down and stopping of the head supports 7 before one of the heads 8 reaches the desired track can be controlled via the tachometer 11, 12 and hence very accurate positioning can be achieved. The control device required for this purpose is not described in further detail herein or shown in the drawings. The stop 20 determines the end position of head supports 7 when the heads 8 are pivoted over the tracks. Once the head 8 has been positioned over the desired track, it is kept on this track by applying a current to the coils 14, the direction in which they act being opposite to the direction of head deviation. Selection of the desired track and location of the head 8 thereon is achieved by a servo system (not shown) which is usually used in memory processing units.

As shown in FIG. 3, the magnetic device 16 is so designed that the pairs of permanent magnets 22 and 23, poles of opposite polarity facing each other, are arranged adjacent to one another in planes parallel to the plane of the coil 14 at a distance 24 from one another.

The coil(s) is (are) approximately rectangular in shape and, as shown in FIG. 2, is (are) in the form of rectangular conductor loops 1 which are electrically connected together in a manner which is not shown, to form one or more spirals.

The width of the permanent magnets 22 and 23, i.e. of their poles, is advantageously such that the conductor portions 1a and 1b always stay within the working air gaps 26a and 26b of the magnetic device 16 when the head supports 7 pivot through their maximum range of travel, i.e. at no time do these conductor portions even partially project beyond the air gaps 26a and 26b. As shown more clearly in FIG. 3, in an embodiment having conductors 1 on both sides of the coil support 2 the magnetic induction in each air gap 26a and 26b becomes effective at the same time. Reference numerals 27 and 28 indicate the directions of magnetic flux in the gaps. The transverse conductor portions 29a and 29b which link the longitudinal portions 1a and 1b are always located outside the air gaps 26a and 26b (cf. FIG. 2). Owing to the fact that the directions of flux 27 and 28 are opposite one another in the air gaps 26a and 26b and the direction of current flow is at right angles to the direction of flux—depending on the arrangement of the coil windings—forces acting in the same direction 30 are exerted on the two conductor portions located within the two air gaps (cf. FIG. 3).

If a plurality of drive units, consisting essentially of coils and coil supports arranged above one another, are used according to the invention to increase torque, the drive units are advantageously so arranged that the opposing poles 31a and 31b of adjacent units are of like polarity to prevent an undesirable weakening of the magnetic flux density. The directions of flux in the two central flux-conducting members 32 are the same, as a result of which the magnetic flux density is not weakened. To achieve this, the current in the coils of the two units must flow in opposite directions and the current strength must be the same, as a result of which the forces exerted are the same and the directions in which they are exerted are also the same. It is of course also possible to arrange two or more drive units next to each other in the same plane.

The upper and lower flux-conducting members bear the reference numeral 38. Between adjacent flux-conducting members 38 and 32 there is arranged a non-magnetic distance piece 39, which ensures that the lines of force close via the pair of permanent magnets 23.

The coil supports 2 can be fastened to the head supports 7 by appropriate, advantageously removable, connecting means, e.g. screws; for example, two or more coil supports can be attached to a single head support 7.

The coil supports 2 and head supports 7 are held in position relative to one another by means of a common centering member, e.g. hub 4 shown in FIG. 1, and a hole 33 in each head support 7 and a pin 34, threaded at each end, which fits snugly therein (cf. FIG. 2). The coil supports 2 are connected together at their outer ends, for example in pairs, advantageously via distance pieces 36, so that a strong assembly is achieved in conjunction with the mounting of the other ends of the coil supports on the hub 4, it thus being possible to adjust and maintain the twin air gaps with their extremely small dimensions. The height of the distance pieces depends of course on the width of the air gaps and the thickness of the flux-conducting members 32 situated between the air gaps.

It is advantageous to use seven printed circuit conductors having a thickness of not more than 70 μm and a width of about 1 mm each, the distance between two adjacent conductors being 0.5 mm, if a steady current of 4 amperes is to flow.

At a mean magnetic induction in the air gap of about 3000 to 3500 gauss the track-to-track access time is of the order of 6 milliseconds in the case of printed circuit conductors having the above dimensions, the average access time being about 35 milliseconds and the access time from the outer track to the inner track and vice versa being 70 milliseconds. These results were obtained in tests using an experimental set-up as shown in FIG. 1.

A sufficiently high magnetic flux density is achieved if magnetic material is employed which has a high energy product and a low demagnetization factor. Small flat pieces of permanent magnet material which have a high energy product $(BH)_{max}$ and are highly insensitive to demagnetizing magnetic fields and are based on cobalt and rare earths are very suitable. However, other suitable magnetic materials may also be used. The small flat pieces of permanent magnet material are thin compared with the flux-conducting member, the thickness ratio being for example 1:8.

Any suitable plastics material of low density and high strength, e.g. glass-fiber-reinforced epoxy resin, may be used as coil support material. To keep the head supports' mass down and to impart great rigidity to them, a magnesium alloy is used as the material of construction and a T-shaped cross section for instance may be employed. However, any other material/design combination which is suitable from the strength point of view may be used.

FIG. 4 shows a flat single-disc memory 50 in diagrammatic representation. Housing 49 mounted on chassis 10 encloses a positioning device 40 consisting of a magnet assembly 16, a coil support 2 and a fork-shaped head support 47 whose magnetic heads 48 scan the tracks on magnetic disc 9.

A disc-accommodating member 46 and drive shaft 45 mounted in bearings 44 enable the disc 9 to be rotated. Coil support 2 and head support 47 are mounted for pivotal movement about axis 43. For the sake of simplification the drive motor and current leads have been omitted.

X designates the overall height of the disc memory above the chassis. This height X is very small, being about 3 cm in practice. As a result, an extremely flat construction is obtained which opens up a wide variety of applications for disc memories, particularly in the office.

We claim:

1. A device for positioning objects of low mass, particularly magnetic heads over preselected tracks on at least one magnetic disc which can be coupled to a drive in a memory processing unit in which there are provided at least one support for at least one magnetic head, which support is pivotable about an axis parallel to the axis of rotation of the magnetic disc, and at least one coil support for a drive means for pivoting the head support, and in which the said drive means includes at least one flat coil with two winding sections which projects into the working air gaps of magnet assembly means, wherein the magnet assembly means includes at least two pairs of flat permanent magnets, the two working air gaps of which are arranged next to each other in the same plane and have the two winding sections of said coil extending therethrough, respectively, and the poles of which are so arranged that poles of unlike polarity are opposite as well as adjacent to each other, and wherein the two pairs of co-planar adjacent poles of opposite polarity are magnetically connected together via two common flat flux-conducting members, respectively, such that a common magnetic circuit is formed extending over the two pairs of permanent magnets, with the respective air gaps therebetween, and the two flux-conducting members in series.

2. A positioning device as claimed in claim 1, wherein a plurality of coil supports and head supports are provided which are so designed that they can be stacked above one another and arranged in a predetermined position relative to the axis about which they rotate.

3. A positioning device as claimed in claim 2, wherein each head support is provided with at least one coil support which is detachably connected thereto.

4. A positioning device as claimed in claim 2, wherein a tachometer consisting of a coil and a fixed magnet is rigidly connected to the head supports.

5. A positioning device as claimed in claim 1, wherein sets of two pairs of permanent magnets are provided with flux-conducting members, the pairs of magnets and the flux-conducting members being arranged above one another.

6. A positioning device as claimed in claim 1, wherein there is provided on the axis a rotatable hub for carrying the coil and head supports.

7. A positioning device as claimed in claim 6, wherein the coil and head supports are provided with apertures so that they can be mounted on the hub.

8. A positioning device as claimed in claim 1, wherein the flat coil consists of a plurality of substantially rectangular conductors, the direction of current flow in the longitudinal conductor portions being so chosen that the resulting force vectors in the magnetic fields in the two working air gaps are in the same direction.

9. A positioning device as claimed in claim 8, wherein the flat coil is applied to the support in the form of a printed circuit.

10. A positioning device as claimed in claim 9, wherein a flat coil in the form of a printed circuit is applied to each side of the support.

11. A positioning device as claimed in claim 1, wherein the pairs of permanent magnets consist of small flat pieces of magnetic material having a high energy product and a low demagnetization factor.

12. A positioning device as claimed in claim 11, wherein the pieces of magnetic material are much thinner than the flux-conducting members.

13. A positioning device as claimed in claim 1, wherein said coil support is pivoted about an axis having at all times the same positional relationship to said magnet assembly means.

14. A device for positioning objects of low mass, particularly magnetic heads over preselected tracks on at least one magnetic disc which can be coupled to a drive in a memory processing unit in which there are provided a plurality of supports for a plurality of magnetic heads, which supports are pivotable about an axis parallel to the axis of rotation of the magnetic discs, and a plurality of coil supports for drive means for pivoting the head supports, and in which the said drive means includes a plurality of flat coils, with two winding sections, each of which projects into the working air gaps of magnet assembly means, wherein the magnet assembly means includes at least two pairs of flat permanent magnets, the two working air gaps of which are arranged next to each other in the same plane and have the two sections of said coil extending therethrough, respectively, and the poles of which are so arranged that poles of unlike polarity are opposite as well as adjacent to each other, and wherein the two pairs of co-planar adjacent poles of opposite polarity are magnetically connected together via two common flat flux-conducting members, respectively, such that a common magnetic circuit is formed extending over the two pairs of permanent magnets, with the respective air gaps therebetween, and the two flux-conducting members in series; the coil supports and head supports being so designed that they can be stacked above one another and arranged in a predetermined position relative to the said axis; and sets of two pairs of magnets being provided with flux-conducting members, which pairs of magnets and flux conducting members are arranged above one another.

15. A positioning device as claimed in claim 14, wherein each flat coil consists of a plurality of substantially rectangular conductors, the direction of current flow in the longitudinal conductor portions being so chosen that the resulting force vectors in the magnetic fields of the two working air gaps are in the same direction.

16. A positioning device as claimed in claim 15, wherein each flat coil is applied to the support in the form of a printed circuit.

17. A positioning device as claimed in claim 14, wherein the pairs of permanent magnets consist of small flat pieces of magnetic material, the thickness ratio between each said small piece and each said flux-conducting member being in the order of 1:8.

* * * * *